United States Patent
Kim

(10) Patent No.: US 8,807,830 B2
(45) Date of Patent: Aug. 19, 2014

(54) BIO MATERIAL TEST DEVICE AND CONTROLLING METHOD THEREOF

(75) Inventor: Jong Cheol Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/345,246

(22) Filed: Jan. 6, 2012

(65) Prior Publication Data

US 2012/0177082 A1    Jul. 12, 2012

(30) Foreign Application Priority Data

Jan. 10, 2011    (KR) .......................... 10-2011-0002334

(51) Int. Cl.
  *G01N 25/00*    (2006.01)
  *G01K 17/00*    (2006.01)

(52) U.S. Cl.
  USPC .............................................. 374/45; 374/33

(58) Field of Classification Search
  CPC ........................................................ G01K 4/04
  See application file for complete search history.

(56) References Cited

U.S. PATENT DOCUMENTS

| | | | | |
|---|---|---|---|---|
| 5,098,196 | A | * | 3/1992 | O'Neill .......................... 374/11 |
| 5,277,191 | A | * | 1/1994 | Hughes ........................ 600/526 |
| 5,474,080 | A | * | 12/1995 | Hughes ........................ 600/526 |
| 6,508,585 | B2 | * | 1/2003 | Nakamura et al. .............. 374/12 |
| 7,262,144 | B2 | * | 8/2007 | Schreder et al. ................ 501/66 |
| 7,282,676 | B1 | * | 10/2007 | Bouchier et al. .............. 219/497 |
| 7,448,798 | B1 | * | 11/2008 | Wang ............................ 374/183 |
| 7,626,144 | B2 | * | 12/2009 | Merzliakov ................... 219/483 |
| 2006/0020371 | A1 | * | 1/2006 | Ham et al. ..................... 700/266 |
| 2008/0101434 | A1 | * | 5/2008 | Horovitz et al. ................ 374/29 |
| 2008/0280350 | A1 | * | 11/2008 | Moriwaki et al. ......... 435/286.1 |
| 2009/0310644 | A1 | * | 12/2009 | Van De Kerkhof et al. .... 374/11 |

FOREIGN PATENT DOCUMENTS

| | | |
|---|---|---|
| JP | 10-333125 A | 12/1998 |
| JP | 2003-068424 A | 3/2003 |

* cited by examiner

*Primary Examiner* — Lisa Caputo
*Assistant Examiner* — Nasir U Ahmed
(74) *Attorney, Agent, or Firm* — Sughrue Mion, PLLC

(57) ABSTRACT

A test device having an internal temperature constantly maintained even when a voltage supplied to the test device is altered, and a control method thereof are provided. The test device includes a heater, a temperature sensor to sense an internal temperature of the test device, and a control part to control a current applied to the heater, in order to prevent a temperature of the heater from being varied due to voltage variation when the voltage supplied to the test device is altered.

7 Claims, 4 Drawing Sheets

BIO MATERIAL TEST DEVICE AND CONTROLLING METHOD THEREOF

CROSS-REFERENCE TO RELATED APPLICATION

This application claims priority from Korean Patent Application No. 10-2011-002334 filed on Jan. 10, 2011 in the Korean Intellectual Property Office, the disclosure of which is incorporated herein by reference.

BACKGROUND

1. Field

Devices and methods consistent with exemplary embodiments relate to a test apparatus requiring constant temperature retention during testing, such as a biomaterial test device, as well as a control method thereof.

2. Description of the Related Art

Equipment for analyzing and testing various biomaterials separated from the human body often requires a constant temperature be maintained during such analysis or testing. In particular, most reactions are actively executed at a temperature such as body temperature. Therefore, the equipment for analysis and examination of biomaterials should maintain a constant temperature during operation thereof.

Such test equipment may maintain an optimum temperature required for testing and analyzing a biomaterial by use of a heater provided in the test equipment for a period of time during which analysis and testing are executed, in the case where a biomaterial to be tested and a device carrying various reagents, which react with the biomaterial, for example, a micro-fluidic device such as a bio-disc, are loaded in a constant temperature space inside the equipment.

An amount of heat provided by the heater is determined by a current flowing through the heater and the current flowing through the heater is determined by a voltage applied to the heater. If there is a variation in voltage supply to the test equipment, such as voltage drop caused by abnormal condition during power supply, current applied to the heater may be varied. In the case where the current flowing through the heater is decreased, the heating produced by the heater is reduced and, consequently, it is difficult to acquire accurate analysis results of a biomaterial, which is sensitive to a surrounding temperature. Accordingly, there is a need for a method to maintain an internal temperature of test equipment even when the voltage applied to a heater is altered.

SUMMARY

Exemplary embodiments provide a test device having an internal temperature constantly maintained to a predetermined level, even though a voltage supplied to the test device is altered, and a control method thereof.

According to an aspect of an exemplary embodiment, there is provided a test device control method for controlling a biomaterial test device including a heater, the method including: determining whether a variation of a voltage supplied to the test device occurs; if it is determined that the variation of the voltage supplied to the test device occurs, determining a heater driving value corresponding to the varied voltage; determining whether there is a difference between an internal temperature of the test device and a preset temperature; if is determined that there is a difference between the internal temperature of the test device and the preset temperature, determining a reference heater driving value to compensate for the difference; and if the determined heater driving value exceeds the reference heater driving value, driving the heater with the reference heater driving value.

When the internal temperature of the test device exceeds the preset temperature, the method may further include blocking voltage supply to the heater.

The heater driving value may be a value at which a constant current flows through the heater, enabling the heater to maintain a predetermined temperature even though the voltage is altered.

According to an aspect of another exemplary embodiment, there is provided a test device including: a heater; a temperature sensor to sense an internal temperature of the test device; and a control part to control a current applied to the heater, in order to prevent a temperature of the heater from being varied due to a variation of the voltage supplied to the test device.

The control part may determine a heater driving value corresponding to the altered voltage when the voltage supplied to the test device is varied.

The heater driving value may be a value at which a current constantly flows through the heater, enabling the heater to maintain a predetermined temperature even when voltage variation occurs.

The control part may determine a reference heater driving value to compensate for a difference between an internal temperature of the test device and a preset temperature, when the difference is determined.

The control part may drive the heater with the reference heater driving value when the heater driving value exceeds the reference heater driving value.

The control part may block voltage supplied to the heater when the internal temperature of the test device exceeds the preset temperature.

The test device may be a device for testing biomaterials.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
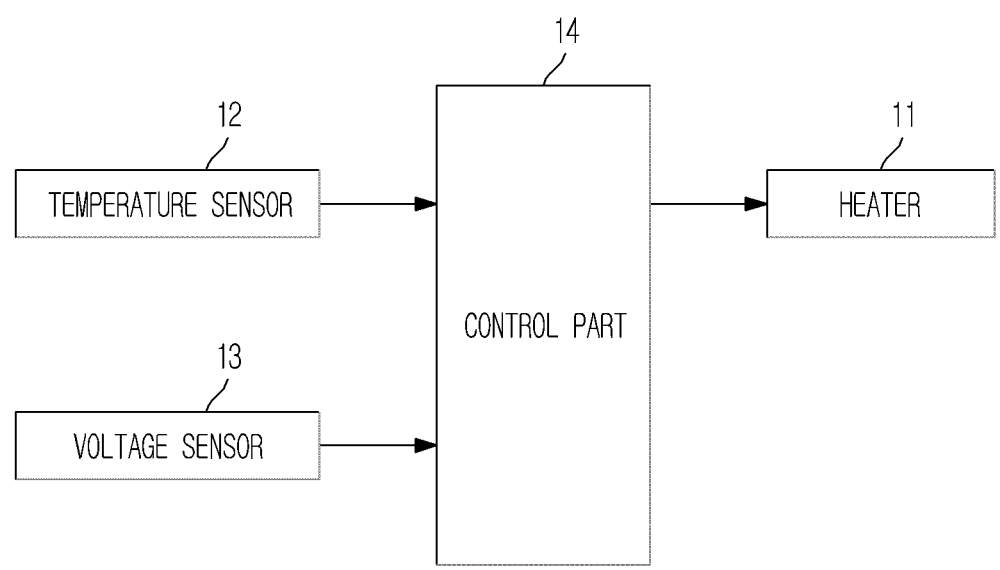
FIG. 1 is a block diagram illustrating the construction of a test device according to an exemplary embodiment.

Hereinafter, advantageous features and characteristics of the inventive concept and practical methods thereof will be clearly understood through the following detailed description of exemplary embodiments with reference to the accompanying drawings. However, at least one exemplary embodiment may be embodied in various other forms, which are not particularly restricted to those described herein.

The same numerals in the drawings refer to substantially the same constructional elements.

FIG. 1 is a block diagram illustrating the construction of a test device according to an exemplary embodiment;

The test device according to an exemplary embodiment is a device for implementing analysis or testing various biomaterial samples. The test device may include a variety of types of equipment.

The sample described herein may include, for example, DNA, oligonucleotides, RNA, PNA, ligands, receptors, antigens, antibodies, milk, urine, saliva, hair, a crop sample, a meat sample, a livestock sample, a processed food sample, a buccal sample, a tissue sample, semen, protein, or other biomaterials, without being particularly limited thereto. An analyzed sample ('analyte') may include, for example, protein, antigen, DNA or RNA, oligonucleotide, receptor, or the like, without being particularly limited thereto. For instance, in the case where urine is used as a sample, examples of the analyte may include blood, glucose, ascorbic acid, ketone, sugar, urobillinogen, billirubin, and so forth.

Hereinafter, a blood tester for analysis of blood will be described as an illustrative example of the test device, however, the technical spirit of the inventive concept is not particularly limited thereto.

As shown in FIG. 1, the test device according to an exemplary embodiment may include: a heater 11 to generate heat to maintain an inner space of the device at a predetermined temperature; a temperature sensor 12 to sense an internal temperature of the device; a voltage sensor 13 to sense a voltage applied to the heater 11; and a control part 14 to receive information sensed by the temperature sensor 12 and the voltage sensor 13, and control driving of the heater 11 based on the information.

The temperature sensor 12 is provided in the device and senses a temperature of the inner space wherein a micro-fluidic device containing a biomaterial and different reagents reacting with the biomaterial is placed. The temperature sensor 12 may be mounted on a structure to which the micro-fluidic device is loaded, in order to more accurately sense the temperature of the inner space (often, referred to as 'internal temperature') wherein the micro-fluidic device is placed.

The voltage sensor 13 may be provided in the device to sense the voltage supplied to the heater 11.

The control part 14 may be a micro-computer to control overall functions of the test device.

The control part 14 may generate a control signal supplied to the heater 11 to maintain the temperature of the inner space of the test device, wherein the micro-fluidic device is placed, while testing a biomaterial sample, e.g., blood, in the test device.

The control part 14 may receive information regarding the internal temperature of the device and the voltage applied to the heater 11, respectively, from the temperature sensor 12 and the voltage sensor 13, and then, control a heating amount produced by the heater 11 based on the information, thereby enabling the test device to be maintained at a predetermined temperature.

The heating amount of the heater 11 may be determined by current flowing through the heater 11 and the current flowing through the heater 11 may be determined by the voltage applied to the heater 11. If there is a variation in voltage supply to the test device, such as a voltage drop caused by abnormal condition during power supply, the current applied to the heater 11 may be altered. For instance, in the case where the current flowing through the heater is decreased, the heating amount of the heater 11 is reduced, in turn, causing a variation in the temperature of the inner space wherein the micro-fluidic device is placed. If there is a variation in temperature, it is difficult to obtain correct analysis results. Therefore, even though the voltage applied to the heater 11 is varied, the current applied to the heater 11 should be regulated to maintain a constant internal temperature of the test device.

The control part 14 may determine whether the voltage supplied to the test device changes. In particular, the control part 14 may receive information for the voltage supplied from the voltage sensor 13 to the test device, and determine whether the voltage supplied to the test device changes. A power source supplying the voltage to the test device may be an external common power or a battery provided in the test device. In particular, if a battery provided in the test device supplies power to the test device, the supplied voltage of the battery is reduced with the passage of time, thus decreasing current supply to the heater 1 and finally reducing the heating amount of the heater 11.

The control part 14, if it is determined that a variation in the voltage supplied to the test device occurs, the control part 14 regulates parameters related with the control of the current applied to the heater 11. Current control parameters may include a gain, a limit in controlled output voltage, and on/off of control output, etc., without being particularly limited thereto.

The control part 14 calculates a heater driving value to flow a predetermined current through the heater 11, thus maintaining a predetermined temperature (e.g., 37° C.) produced by the heater, although there is a variation in the voltage supplied to the test device.

For instance, when the voltage applied to the heater 11 has a minimum voltage of 12V and a maximum voltage of 18V, it is possible to set a current variation control (mode) based on the voltage variation, with reference to the minimum voltage of 12V, which is applied to the heater 11. That is, supposing that: when the voltage of 12V is applied to the heater 11, a heater driving value (pulse width modulation, hereinafter, 'PWM'), at which a maximum current can be applied to the heater 11 to maintain the heater at 37° C., is 249. On the other hand, when the voltage of 18V is applied to the heater 11, the PWM at which a current equal to the maximum current can be applied to the heater 11 (wherein the maximum current can flow when the voltage of 12V is applied) is supposed to be 200. In this case, using a linear relationship between the above two results, it is possible to calculate a PWM at which a maximum current flowing through the heater 11 may be constant, even though the voltage is altered.

The control part 14 may determine whether the internal temperature of the device is varied due to variation in voltage supplied to the test device. By receiving information regarding the internal temperature from the temperature sensor 12, occurrence of temperature variation in the inner space of the test device may be determined.

If it is determined that the internal temperature of the test device is varied, the control part 14 calculates a reference PWM to compensate for a difference between the internal temperature and a preset internal temperature (e.g., 37° C.) of the test device.

Then, by comparing the PWM calculated to control a variation in current due to voltage variation with the reference PWM, if the PWM exceeds the reference PWM, the heater 11 is driven with the reference PWM. On the other hand, if the PWM is lower than the reference PWM, the heater 11 is driven with the PWM.

Figure 2A:
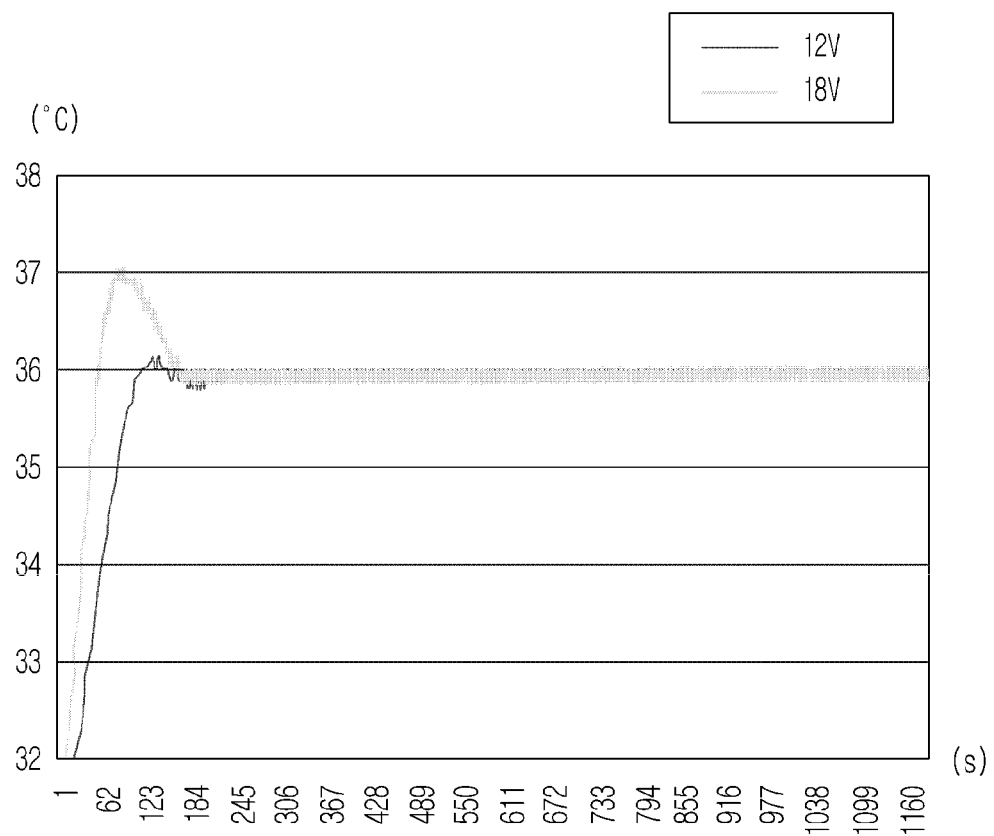
FIGS. 2A and 2B are graphs showing temperature control results obtained by a test device control method according to an exemplary embodiment.

In the case of omitting comparison to the reference PWM, when the PWM is applied to the heater 11 to supply constant current to the heater 11, thus maintaining the heater 11 at a predetermined temperature (e.g., 37° C.) even though the voltage supplied to the test device is altered, a temperature overshoot after reaching a desired set temperature may be about 0.1° C. if the minimum voltage applied to the heater 11 is 12V, thus being acceptable. On the other hand, in the case where 18V is applied, the temperature overshoot may be high, such as about 1° C., in turn adversely influencing test results of a biomaterial (see FIG. 2A).

Figure 2B:
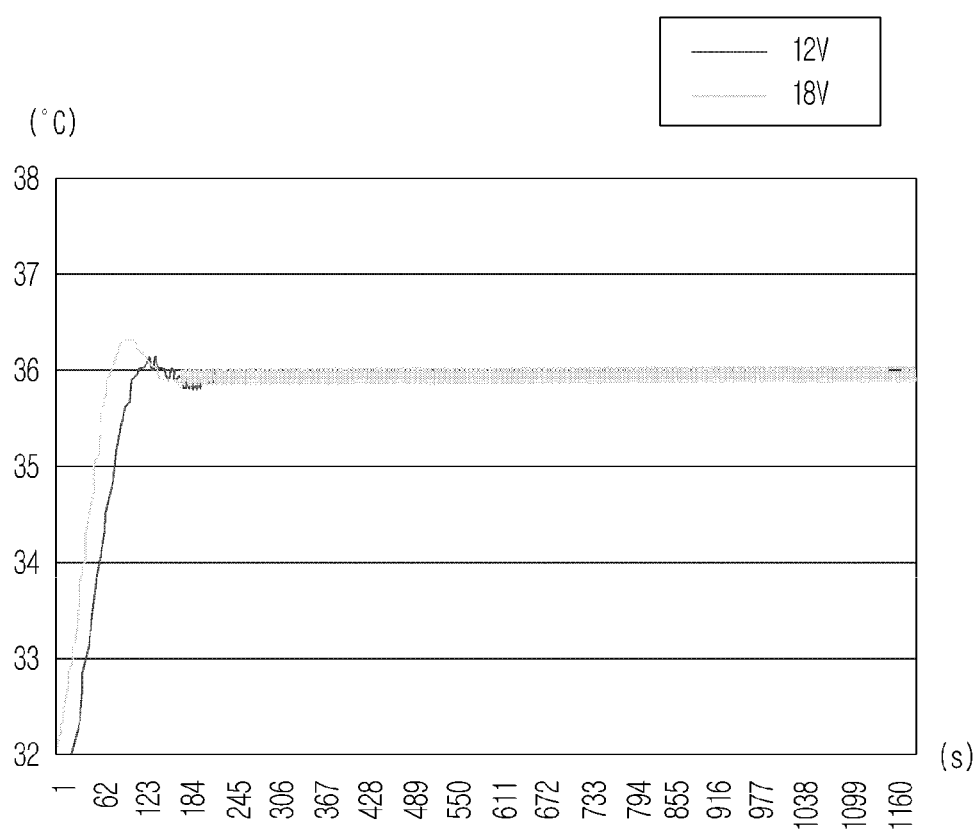

However, if the PWM is determined on the basis of the reference PWM by comparing it to the reference PWM, the temperature overshoot may be about 0.3° C. even when 18V is applied, thus being acceptable. Consequently, more accurate test results of the biomaterial may be acquired (see FIG. 2B).

In the case where the internal temperature of the test device exceeds a specific level (e.g., 0.5° C. or more) above the preset temperature, the control part 14 may be operated to block the voltage supplied to the heater 11, so as to prevent occurrence of temperature overshoot.

The control part 14 may prevent the temperature overshoot occurring after reaching a desired set temperature, by an operation to compare the PWM with the reference PWM and, if the internal temperature of the test device exceeds a specific level above the preset temperature, by a further operation to block the voltage supplied to the heater 11.

Figure 3:
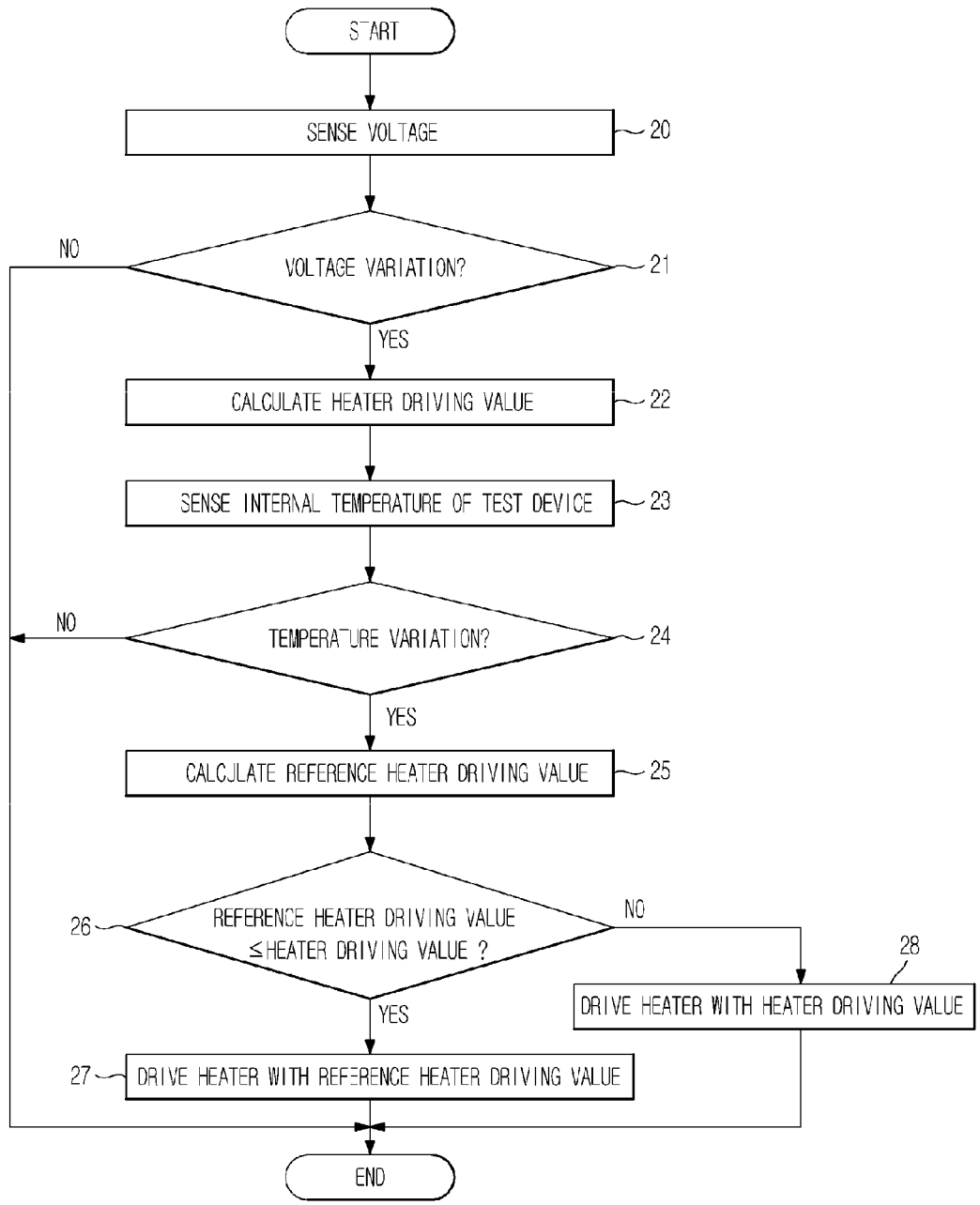
FIG. 3 is a flowchart illustrating a temperature control method of a test device according to an exemplary embodiment.

FIG. 3 is a flowchart illustrating a temperature control method of a test device according to an exemplary embodiment.

As shown in FIG. 2, the voltage sensor 13 senses a voltage supplied to the test device (operation 20). When the voltage is sensed by the voltage sensor 13, the control part 14 determines whether a variation the voltage supplied to the test device occurs (operation 21). For instance, in the case where the voltage is supplied from the battery to the test device, if the supplied voltage of 18V is decreased to 12V, the voltage sensor 13 senses the change in voltage and transfers the sensed result to the control part 14, and the control part 14 determines that the voltage supplied to the test device has dropped, based on the sensed result.

When voltage variation occurs, the control part 14 calculates a PWM (operation 22). For instance, if the voltage drops and a current applied to the heater 11 is reduced, the heating extent of the heater 11 is reduced and the control part 14 calculates a PWM to compensate for a reduction in the current.

The temperature sensor 12 provided in the test device may sense the internal temperature of the test device (operation 23). When the internal temperature of the test device is sensed by the temperature sensor 12, the control part 14 determines whether the internal temperature is varied (operation 24). For instance, in the case where the voltage drops and the heating extent of the heater 11 is reduced, if the internal temperature of the test device is decreased below the desired set temperature (e.g., 37° C.), the temperature sensor 12 senses the decrease in temperature and transfers the sensed result to the control part 14, and the control part 14 determines that the internal temperature of the test device has been decreased, based on the sensed result.

When variation in the internal temperature of the test device occurs, the control part 14 calculates a reference PWM to compensate for a difference between the internal temperature and the set temperature (operation 25). For instance, if the internal temperature of the test device is decreased below the set temperature, the control part 14 calculates a PWM to compensate a difference in temperature caused by the foregoing, and the calculated PWM becomes a reference PWM.

After the reference PWM is calculated, the control part 14 compares the PWM with the reference PWM (operation 26) and, if the PWM exceeds the reference PWM, drives the heater 11 with the reference PWM (operation 27). On the other hand, if the PWM is less than the reference PWM, the heater 11 is driven by the PWM (operation 28).

According to an aspect of the exemplary embodiments, the internal temperature of the test device may be kept constant even though power supplied to the test device is varied. In addition, by constantly maintaining the internal temperature of the test device, test results of the biomaterial may be acquired with higher reliability.

A few exemplary embodiments described herein with accompanying drawings are only proposed for illustrative purposes without restriction of the scope of the invention. It would be clearly appreciated by those skilled in the art that substitutions, variations and/or modifications may be made within the technical spirit of the inventive concept and the inventive concept is not limited to specified technical configurations and arrangements illustrated or described in this disclosure.

What is claimed is:

1. A control method of a biomaterial test device including a heater, the control method comprising:
    determining whether a variation of a voltage supplied to the test device occurs;
    in response to determining that the variation of the voltage supplied to the test device occurs, determining a heater driving value corresponding to the varied voltage;
    determining whether there is a difference between an internal temperature of the test device and a preset temperature;
    in response to determining that there is a difference between the internal temperature of the test device and the preset temperature, determining a reference heater driving value to compensate for the difference;
    determining whether the heating driving value exceeds the reference heater driving value; and
    in response to determining that the heater driving value exceeds the reference heater driving value, controlling the heater with the reference heater driving value.

2. The control method according to claim 1, further comprising: in response to determining that the internal temperature of the test device exceeds the preset temperature, blocking the voltage supplied to the heater.

3. The control method according to claim 1, wherein the heater driving value is a value at which a constant current can flow through the heater, thus enabling the heater to maintain a predetermined temperature, even when voltage variation occurs.

4. A test device comprising:
    a heater that generates heat to heat an inner space of the test device;
    a temperature sensor that senses a temperature of the inner space of the test device; and
    a control part that determines a variation in a voltage supplied to the test device and in response to determining that the variation of the voltage supplied to the test device has occurred determines a heater driving value corresponding to the varied voltage,
    determines whether there is a difference between an internal temperature of the test device and a preset temperature and in response to determining that there is a difference between the internal temperature of the test device and the preset temperature, determines a reference heater driving value to compensate for the difference, and
    determines whether the heating driving value exceeds the reference heater driving value and in response to determining that the heater driving value exceeds the reference heater driving value controls the heater with the reference heater driving value.

5. The test device according to claim 4, wherein the heater driving value is a value at which a constant current can flow through the heater so that the heater maintains a predetermined temperature regardless of the variation of the voltage supplied to the test device.

6. The test device according to claim 4, wherein if the internal temperature of the test device exceeds the preset temperature, the control part blocks the voltage supplied to the heater.

7. The test device according to claim 4, wherein the test device is a device for testing biomaterials.

\* \* \* \* \*